(12) United States Patent  
Lu et al.

(10) Patent No.: US 8,112,627 B2  
(45) Date of Patent: Feb. 7, 2012

(54) SYSTEM FOR SELF-SERVICE RECHARGING AND METHOD FOR THE SAME

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 961 days.

(21) Appl. No.: 12/106,379

(22) Filed: Apr. 21, 2008

(65) Prior Publication Data

US 2009/0132819 A1  May 21, 2009

(30) Foreign Application Priority Data

Nov. 16, 2007 (CN) .......................... 2007 1 0177398

(51) Int. Cl.
*H04L 9/32* (2006.01)

(52) U.S. Cl. ........ 713/169; 713/155; 713/159; 713/168; 713/170; 380/229; 726/7; 726/20; 726/30; 705/31; 705/39; 705/42; 705/67

(58) Field of Classification Search .................. 713/169, 713/168, 170, 155, 159; 380/229; 726/7, 726/20, 30; 705/31, 39, 42, 67
See application file for complete search history.

(56) References Cited

U.S. PATENT DOCUMENTS

| | | | | |
|---|---|---|---|---|
| 7,873,573 | B2 * | 1/2011 | Realini | 705/39 |
| 2002/0046188 | A1 * | 4/2002 | Burges et al. | 705/67 |
| 2003/0101112 | A1 * | 5/2003 | Gallagher et al. | 705/31 |
| 2004/0093307 | A2 * | 5/2004 | Paglin | 705/42 |
| 2004/0186998 | A1 * | 9/2004 | Kim et al. | 713/169 |
| 2006/0129563 | A1 * | 6/2006 | Phillips et al. | 707/10 |
| 2007/0157309 | A1 * | 7/2007 | Bin et al. | 726/15 |
| 2007/0226350 | A1 * | 9/2007 | Sanda et al. | 709/227 |
| 2007/0244811 | A1 * | 10/2007 | Tumminaro | 705/39 |
| 2007/0255653 | A1 * | 11/2007 | Tumminaro et al. | 705/39 |
| 2007/0255662 | A1 * | 11/2007 | Tumminaro | 705/79 |
| 2008/0201769 | A1 * | 8/2008 | Finn | 726/7 |
| 2009/0151007 | A1 * | 6/2009 | Koster et al. | 726/30 |
| 2010/0185860 | A1 * | 7/2010 | Mishra et al. | 713/169 |
| 2011/0086611 | A1 * | 4/2011 | Klein et al. | 455/407 |

FOREIGN PATENT DOCUMENTS

KR  2002-0029061  4/2002

* cited by examiner

*Primary Examiner* — Thu Ha Nguyen  
(74) *Attorney, Agent, or Firm* — Hammer & Associates, P.C.

(57) ABSTRACT

The present invention discloses a method for self-service recharging and a system for the same, relating to the security communications of online banking. The system comprises a client and a server. The method mainly comprises the steps of: 1) establishing a data security channel between the client and the server; 2) inputting an identifier by a user to a secure transaction device; 3) determining whether the identifier is legitimate; and if legitimate allowing the user to input a recharging operation message; 4) connecting to the server and transmitting a recharging operation request packet after receiving the recharging operation message; 5) verifying whether the secure transaction device is legitimate by the server according to information in a database stored natively, and if legitimate, deducting a recharging amount from a user account, recording an operation log, and transmitting a recharging permission command packet to the secure transaction device; and 6) conducting a recharging operation by the secure transaction device and recording an operation log. The present invention provides a way to conveniently and rapidly recharge.

17 Claims, 3 Drawing Sheets

SYSTEM FOR SELF-SERVICE RECHARGING AND METHOD FOR THE SAME

FIELD OF THE INVENTION

The present invention relates to secure communications of online banking, and more particularly, to a system for self-service recharging and a method for the same.

BACKGROUND OF THE INVENTION

With the development of computer network technologies, the conventional cash payment mode has been gradually replaced with online banking for its convenience and availability. The so-called "online banking" is carried out on the Internet to provide financial services to the customers. The customers can almost complete any banking transactions online, such as inquiring account affairs, transferring, trading foreign exchange, shopping online, or registering the lost card, instead of laboriously going to counter of a bank. By online banking, the efficiency is improved for both the customers and the bank, and the cost is cut off at the same time.

The conventional payment uses cash. It is neither convenient nor safe to carry a lot of cashes. Therefore, the electronic wallet comes out. The electronic wallet is a software application used for secure electronic transactions and preservation of transaction history. The electronic wallet has such features as 1) managing electronic security credentials, for example, requesting, saving, or deleting an electronic security credential;

2) securing electronic transactions, for example, authenticating the customer and transmitting transaction information upon conducting a transaction; and 3) saving transaction history, for example, saving a record of a transaction for later inquiry; or encrypting and transmitting and verifying for validity account information (e.g. the account number and expiration date) and payment instructions when shopping online.

The process of use of the electronic wallet consists of registering an electronic wallet, adding a bank card, and bank card payment. It centralizes the management of different electronic currencies, credit cards, and personal information card, etc. The electronic wallet is secure and convenient without the need of storing personal information on a personal computer. The customer can complete a transaction online in less than 20 seconds.

The Public Key Infrastructure (PKI) is an infrastructure created with the public key theory and technology for providing security services. The customer can carry out secure electronic transactions, communications, and other activities on the Internet with services provided by the PKI platform. In PKI technology, certificates are used for managing public keys, and the public keys of a customer are associated with his other identification information by the Certificate Authority, a third-party trusted authority, for authenticating the customer over the Internet. Currently, the confidentiality, the authenticity, the integrity, and the non-repudiation of information transmission are maintained by encrypting and signing the digital information to be transmitted using digital certificates based on the PKI. The PKI is a set of software and hardware relating to create, issue, manage, and revoke a public key certificate. The core element of the PKI is the digital certificate, and the core implementer of the PKI is the CA.

The regular carrier of the electronic wallet is the smart card, which is also known as the Integrated Card (IC). A customer may have many smart cards to conduct different transactions, so that a loading process sometimes is needed. The so-called "loading" means to recharge the smart card with fund from a personal account.

At present, the holder of the smart card often has to go to a specified site to recharge the card. It is, to some extent, not convenient to use the electronic wallet (e.g. time and energy consuming). If the customer did not complete loading for some reason, some important information (e.g. actual amount received) cannot be updated in time. As a result, the customer may still not conduct a transaction. In prior art, the loading transaction of online banking is done by the intranet on the bank side. A secure and reliable method for conducting the loading operation by a public network has not been developed yet.

SUMMARY OF THE INVENTION

To overcome the problem of inconvenience in recharging the electronic wallet and provide a way to enable the native machine to carry out transactions through a public network, the present invention discloses a system for self-service recharging and a method for the same. The solution is as follows.

A system for self-service recharging, comprising a client and a server, in which the client comprises a first authentication module, a key agreement module, and a secure transaction device, while the server comprises a second storage module, a second authentication module, and a second service performance module, in which the first authentication module is adapted to verify whether the server is legitimate;

the key agreement module is adapted to conduct, together with the secure transaction device, a key agreement process with the server, to establish a data security channel according to a result of the key agreement process, if the server is legitimate based on a verification of the first authentication module;

the secure transaction device comprises a first storage module for storing data and a key agreement algorithm relating to the key agreement process with the server and a certificate of the secure transaction device;

a user authentication module for verifying whether an identifier of a user is legitimate after receiving the identifier from an input of the user; and a first service performance module for allowing the user to input a recharging operation message after the user is verified by the user authentication module, transmitting a recharging operation request packet to the server and receiving a recharging permission command packet returned from the server, and conducting a recharging operation and recording an operation log and a transaction process after verifying the recharging permission command packet; the recharging operation request packet comprising a user account and a recharging amount; and the server comprises a second storage module for storing user account information, user identity information, data and the key agreement algorithm relating to the key agreement process with the secure transaction device, and a certificate of the server;

a second authentication module for verifying whether the secure transaction device is legitimate, conducting a key agreement process with the secure transaction device using the data and algorithm from the second storage module to establish a data security channel if the secure transaction device is legitimate; and verifying whether the recharging operation request packet is legitimate according to the user account information and user identity information from the second storage module, after receiving the recharging operation request packet transmitted from the secure transaction device; and a second service performance module for deducting a recharging amount from the user account and returning the recharging permission command packet to the secure transaction device if the recharging operation request packet is legitimate; the recharging permission command packet comprising a transaction time and a recharging amount;

the recharging operation request packet transmitted from the first service performance module of the secure transaction device further comprises a first message authentication code;

accordingly, the second storage module of the server comprises an authentication algorithm for verifying the certificate of the secure transaction device and an algorithm for generating a first information verification code; and the second authentication module comprises a security authentication unit for verifying whether the certificate of the secure transaction device is legitimate using the authentication algorithm from the second storage module; if legitimate, conducting a key agreement process with the secure transaction device to establish a data security channel with the secure transaction device by the server; otherwise, the data security channel being not established, but terminating; and a recharging operation request packet authentication unit for verifying whether the user account information in the second storage module complies with the recharging operation after receiving the recharging operation request packet from the secure transaction device; if the user account information complies with the recharging amount in the recharging operation request packet, generating a first information verification code using an algorithm in the second storage module and verifying the first message authentication code from the recharging operation request packet against the first information verification code; if identical, the recharging operation request packet being legitimate.

The recharging permission command packet returned from the service performance module of the server to the secure transaction device also comprises a second message authentication code;

accordingly, the first storage module of the secure transaction device is adapted to store an algorithm for generating the second information verification code;

the secure transaction device comprises an authentication module for generating a second information verification code using the algorithm from the first storage module and verifying the second message authentication code from the recharging permission command packet against the second information verification code after receiving the recharging permission command packet returned from the server; if identical, the second information authentication being legitimate and notifying the first service performance module of performing an recharging operation; otherwise, transmitting an error message to the server; and the server comprises a recharging withdrawal module for canceling the recharging operation, compensating the recharging amount deducted by the service performance module from the user account and revising the operation log, after receiving the error message transmitted from the secure transaction device.

The first service performance module comprises an initialization operation command generation unit for allowing the user to input a recharging operation message after the identifier of the user is verified by the user authentication module, packing the recharging operation message, and generating a recharging initialization operation command;

an operation confirmation transmission unit for transmitting an operation confirmation to the user according to the recharging initialization operation command after the initialization operation command generation unit generates a recharging initialization operation command;

a determination unit for determining whether the confirmation of the user is correct;

a recharging request transmission unit for transmitting a recharging operation request packet to the server through a computer if the confirmation of the user is correct; the recharging operation request packet comprising a user account and a recharging amount; and a recharging operation performance unit for conducting a recharging operation and recording an operation log after receiving the recharging permission command packet returned from the server.

The secure transaction device comprises a transaction notification module for transmitting a transaction performance information packet to the server after conducting the recharging operation and recording the operation log;

accordingly, the server comprises a recharging confirmation module for determining whether the information in the transaction performance information packet is correct after receiving the transaction performance information packet transmitted from the secure transaction device; if correct, notifying the user of successfully recharging; otherwise, canceling the recharging operation, compensating the recharging amount deducted from the user account, revising the operation log, and transmitting an error message to the user.

The system comprises a smart card device for transmitting a deposit balance message to the secure transaction device and verifying whether the user is legitimate; if legitimate, obtaining a recharging amount from the secure transaction device.

The secure transaction device comprises a prompt module for prompting an error to the user if the user is not legitimate based on the verification of the smart card device; and a recharging amount transmission module for transmitting a recharging amount to the smart card device if the user is legitimate based on the verification of the smart card device.

The prompt module is a sonic module with a voice prompt feature or a display module with a display feature.

The smart card device is a contact or contactless smart card device.

The contactless smart card device comprises a first antenna module for transmitting the deposit balance message to the secure transaction device and inducing and receiving the recharging amount transmitted from the secure transaction device;

a first RF (Radio Frequency) module for converting the recharging amount from the secure transaction device from an electromagnetic wave signal to digital information by modulation/demodulation means and transmitting the information to the first antenna module, and converting the deposit balance message received by the first antenna module to an electromagnetic wave signal and transmitting the signal to the secure transaction device; and an electronic cash storage module for storing the recharging amount received by the first antenna module;

accordingly, the secure transaction device comprises a second antenna module for transmitting the recharging amount to the contactless smart card device, and inducing and receiving the deposit balance message transmitted from the contactless smart card device; and a second RF (Radio Frequency) module for converting the deposit balance message transmitted from the contactless smart card device from an electromagnetic wave signal to digital information by modulation/demodulation means and transmitting the information to the second antenna module, and converting the recharging amount received by the second antenna module to an electromagnetic wave signal and transmitting the signal to the contactless smart card device.

In addition, the present invention also provides a method for self-service recharging. The method comprises the steps of:

A. connecting a client with a server;

B. authenticating each other between the server and a secure transaction device for legitimacy; if both legitimate, conducting a key agreement process between the client and the server to establish a data security channel, and then going to the step C; otherwise, the data security channel being not established between the client and the server, but terminating;

C. packing the recharging operation message, generating a recharging initialization operation command and transmitting, by the secure transaction device, an operation confirmation to the user, after receiving an input of a recharging operation message by a user;

D. transmitting a recharging operation request packet, by the secure transaction device, to the server after the operation confirmation being confirmed by the user; the recharging operation request packet comprising a user account of the user and a recharging amount;

E. verifying whether the recharging operation request packet is legitimate by the server after receiving the recharging operation request packet; if legitimate, deducting the recharging amount from the user account, recording an operation log, transmitting a recharging permission command packet to the secure transaction device, and then going to the step F; otherwise, prompting an error to the user through the secure transaction device;

F. conducting a recharging operation after receiving the recharging permission command packet, recording an operation log, and then transmitting a transaction performance information packet to the server by the secure transaction device; and G. determining whether the recharging transaction information in the transaction performance information packet is correct by the server; if correct, prompting successfully recharging to the user; otherwise, canceling the recharging operation, compensating the recharging amount deducted from the user account, revising the operation log, and prompting a recharging failed message to the user.

The authenticating each other between the server and a secure transaction device for legitimacy at the step B comprises:

authenticating whether the certificate of the secure transaction device is legitimate by the server; and authenticating whether the certificate of the server is legitimate by the secure transaction device.

The step C comprises:

inputting an identifier by the user to the secure transaction device, and determining by the secure transaction device whether the identifier is legitimate; if legitimate, allowing the user to input the recharging operation message; otherwise, prompting an error the user.

The recharging operation request packet at the step D comprises a first message authentication code generated by the secure transaction device;

accordingly, the verifying whether the recharging operation request packet is legitimate at the step E comprises:

verifying whether the user account information complies with the recharging amount from the recharging operation request packet by the server; if yes, going to the next operation; otherwise, terminating; and verifying whether the first message authentication code from the recharging operation request packet is legitimate by the server after verifying the recharging amount; if yes, the recharging operation request packet being legitimate; otherwise, the packet being not legitimate.

The recharging permission command packet at the step E comprises a second message authentication code;

accordingly, the step F comprises:

verifying by the secure transaction device the second message authentication code from the recharging permission command packet; if legitimate, conducting the recharging operation; otherwise, transmitting an error message to the server; and canceling the recharging operation by the server after receiving the error message, compensating the amount deducted from the user account, and then revising the operation log.

The method comprises the steps of:

H. moving the smart card device by the user into a valid range of the secure transaction device for reading the card;

I. reading a deposit balance amount from the smart card device by the secure transaction device, outputting the deposit balance amount through a prompting means of the secure transaction device, and prompting the user to input a user identifier for the smart card device; and J. determining whether the user identifier is correct after inputting the user identifier by the user; if correct, transmitting a recharging amount to the smart card device; otherwise, prompting an error to the user.

The step H comprises:

authenticating each other between the smart card device and the secure transaction device; if both positive, going to the step I; otherwise, prompting an error to the user.

With the system and the method provided by the present invention, the user does not necessarily perform operations on an ATM machine specified by the bank or on a terminal at the bank and online transactions are secured by combining the PKI and digital cash services with online banking. Moreover, the interaction of recharging information between a native machine and a server is realized conveniently and securely through a public network. And both the secure transaction device and the smart card can be used for consumption, providing an improved flexibility and availability of the system, and thus bringing the online banking customers more convenience.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

The present invention is further described with the embodiments and the drawings below.

In the following embodiments, the user is an electronic wallet user, the server is an online banking server, and the client consists of a client computer and a USB key connected to the client computer; or the client is a client computer as well as a USB key and a contactless IC card connected to the client computer. The USB key herein is a portable hardware device with a USB interface, a built-in processor and a memory, which can be connected with a computer via its data communication interface.

The USB key involved in the following embodiments has an electronic wallet function, and is distributed to a user by a bank as a carrier of the digital cash. The online banking server and the USB key have been associated with a PKI network, so that the online banking server and the USB key have carried legitimate certification information (e.g. digital certificates, public keys, and names). After the server and the client have authenticated each other for legitimacy and established a data security channel, the user is able to recharge the USB key online only if he has been authenticated by the USB key itself positively, and the recharging operation request packet and the recharging permission command packet have both been verified.

Figure 1:
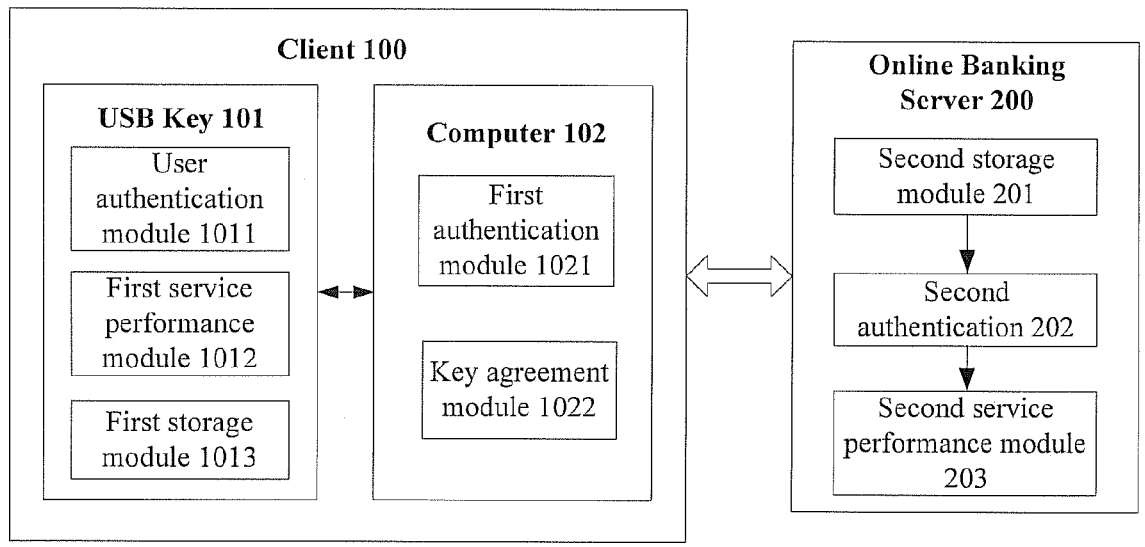
FIG. 1 is a block diagram of a system for self-service recharging according to the first embodiment of the present invention.

Referring to FIG. 1, the present embodiment provides a system for self-service recharging, which may be a loading system, a gas station card recharging system, a taxation recharging system, and a social insurance recharging system, etc.

The system comprises a client 100 and an online banking server 200; the client 100 further comprises a USB key 101 and a computer 102; and the online banking server 200 further comprises a second storage module 201, a second authentication module 202, and a second service performance module 203.

The USB key 101 further comprises a user authentication module 1011 for verifying whether the identifier of the user is legitimate after receiving an identifier input by a user;

a first service performance module 1012 for allowing the user to input a recharging operation message after verifying the identifier of the user by the user authentication module 1011, transmitting a recharging operation request packet, which comprises a user account and a recharging amount, to the online banking server 200 through the computer 102, conducting a recharging operation after receiving a recharging permission command packet returned by the online banking server 200, recording an operation log, and finally completing a transaction process on the transaction terminal; and a first storage module 1013 for storing data and a key agreement algorithm relating to the process of a key agreement between the computer 102 and the online banking server 200, and storing a certificate of the USB key 101.

The computer 102 comprises a first authentication module 1021 for verifying whether the online banking server 200 is legitimate; and a key agreement module 1022 for conducting a key agreement process, together with the USB key 101, with the online banking server 200 if the server 200 is legitimate based on the verification of the first authentication module 1021, generating a session key according to the result of the key agreement process to establish a data security channel.

The online banking server 200 comprises a second storage module 201 for storing user account information, user identity information, and information of the USB key 101;

a second authentication module 202 for verifying whether the USB key 101 is legitimate based on the information of the USB key 101 from the second storage module 201 after receiving the recharging operation request packet transmitted from the USB key 101; and a second service performance module 203 for deducting a recharging amount from the user account and returning a recharging permission command packet, which comprises a transaction time and a recharging amount, to the USB key 101 if it is legitimate based on the verification of the second authentication module 202.

There are user information, digital certificates, and transaction logs for performing an electronic wallet function in the second storage module 201, where one or more digital certificates are associated with a user account of the online banking server 200. There is also configured basic information including service types, as well as standards and/or specifications of online banking electronic transactions relating to recharging applications on the online banking server 200.

The recharging operation request packet transmitted from the first service performance module 1012 of the USB key 101 also comprises a first message authentication code; accordingly, the second storage module 201 of the online banking server 200 also stores an algorithm for generating a first information verification code.

The second authentication module 202 comprises a security authentication unit for verifying whether the certificate of the USB key 101 is legitimate using a verification algorithm in the second storage module 201; if legitimate (i.e. the USB key 101 is legitimate), a key agreement between the USB key 101 and the online banking server 200 is conducted and a data security channel is established; otherwise, the USB key 101 is not legitimate, and a data security channel with the USB key 101 will not be established, then operations terminate; and a recharging operation request packet authentication unit for verifying whether the user account information in the second storage module 201 complies with the recharging operation after receiving a recharging operation request packet transmitted from the USB key 101; if the user account information complies with the recharging amount in the recharging operation request packet, a first information verification code is generated using an algorithm in the second storage module 201, and is compared with the first message authentication code from the recharging operation request packet; if they are identical, the recharging operation request packet is legitimate.

In addition to the first message authentication code, the recharging operation request packet also comprises user identity information, electronic wallet balance, card number of the transaction account, recharging amount, serial number of the online transaction, key version number, algorithm identifier, and pseudo random number (for IC card or USB key). The first message authentication code is a function of the recharging initialization operation command. It is generated by computing data in the recharging initialization operation command using an internal algorithm from the USB key. An algorithm is also previously stored on the online banking server 200 for generating the first information verification code.

Further, the recharging permission command packet returned from the second service performance module 203 to the USB key 101 also comprises a second message authentication code to prevent from counterfeiting the server by a hacker;

accordingly, the first storage module 1013 of the USB key 101 is also adapted to store an algorithm for generating a second information verification code.

The USB key 101 also comprises an authentication module for generating the second information verification code using an algorithm from the first storage module 1013, comparing the second information verification code with the second message authentication code from the recharging permission command packet after receiving the recharging operation request packet returned from the online banking server 200; if they are identical, the second message authentication code is legitimate, and the first service performance module 1012 is informed of conducting a recharging operation; otherwise, an error message is transmitted to the online banking server 200; and the online banking server 200 also comprises a recharging withdrawal module for canceling the recharging operation after receiving the error message transmitted from the USB key 101, compensating the amount deducted from the user account by the second service performance module 203, and revising the operation log.

The recharging permission command packet also comprises transaction date, transaction time, and recharging amount, in addition to the second message authentication code. The second message authentication code is a function of the information in the recharging operation request packet, transaction date, and transaction time transmitted from the client. It is generated by computing the information in the recharging operation request packet, transaction date, and transaction time using an internal algorithm from the server. The algorithm for generating the second information verification code is also previously stored on the USB key 101. The algorithm may, or may not, be the same as the algorithm for generating the first message authentication code.

The first service performance module 1012 comprises an initialization operation command generation unit for allowing the user to input a recharging operation message if the identifier of the user is legitimate based on verification of the user authentication module 1011, packing the message, and then generating a recharging initialization operation command;

an operation confirmation transmission unit for transmitting an operation confirmation to the user according to the recharging initialization operation command after the command is generated by the recharging initialization operation command generation unit;

a determination unit for determining whether the confirmation of the user is correct; and a recharging request transmission unit for transmitting a recharging operation request packet, which comprises a user account and a recharging amount, to the online banking server 200 through the computer 102 if the confirmation of the user is correct.

To make sure that the transaction is completed successfully, and the transaction is processed accordingly among the USB key 101 and the online banking server 200, the USB key 101 also comprises a transaction notification module for transmitting a transaction performance information packet to the online banking server 200 after conducting a recharging operation and recording an operation log;

accordingly, the online banking server 200 also comprises a recharging confirmation module for determining whether the information in the transaction performance information packet is correct after receiving the transaction performance information packet transmitted from the USB key 101; if correct, notifying the user of successfully recharging; otherwise, canceling the recharging operation, compensating the amount deducted from the user account, revising the operation log, and notifying the user of failed recharging.

The USB key 101 can be a USB key or USB token with an electronic wallet function. The USB key can be connected with a computer via a serial interface, a USB interface, an infrared interface, a Bluetooth interface, or a RF interface.

Figure 2:
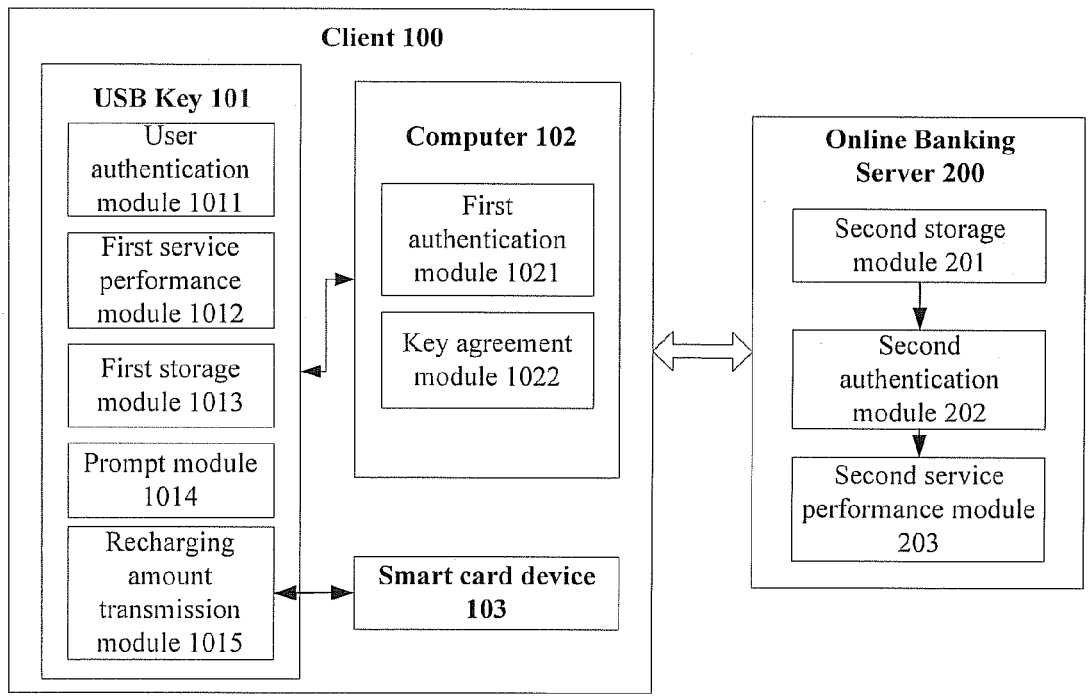
FIG. 2 is a block diagram of another system for self-service recharging according to the first embodiment of the present invention.

Referring to FIG. 2, if a user is intended to transfer an amount from one of the banking cards on the USB key 101 to a smart card device (e.g. a bus IC card) after the USB key 101 is recharged through the online banking server 200, on top of the system as shown in FIG. 1 the system for self-service recharging also comprises:

a smart card device 103 for transmitting a deposit balance message to the USB key 101, authenticating the user, and obtaining a recharging amount from the USB key 101 if the user is a legitimate user.

To improve the security, the smart card device 103 and the USB key 101 can authenticate each other by comparing the identification codes previously stored on each of them. In particular:

The USB key 101 reads an identification code, which is, for example, a card number, from the smart card device 103, compares the identification code with each of the identification codes of legitimate smart card devices stored on the USB key 101, and verifies whether the smart card device 103 is legitimate by determining whether the two codes are identical; and The smart card device 103 receives an identification code, which is, for example, a hardware serial number, from the USB key 101, compares the identification code with each of the identification codes of legitimate USB keys stored on the smart card device 103, and verifies whether the USB key 101 is legitimate by determining whether the two codes are identical.

To improve the recharging operation between the USB key 101 and the smart card device 103, the USB key 101 can also comprises:

a prompt module 1014 for prompting the user an error if the user is not legitimate based on the verification of the smart card device 103; and a recharging amount transmission module 1015 for transmitting a recharging amount to the smart card device 103 if the user is legitimate based on the verification of the smart card device 103.

The prompt module 1014 is a sonic module with a voice prompt feature or a display module with a display feature.

The smart card device 103 can either be a contact smart card device or a contactless smart card device.

If the smart card device 103 is a contactless smart card device, it comprises:

a first antenna module for transmitting a deposit balance to the USB key 101, and inducing and receiving the recharging amount transmitted from the USB key 101;

a first RF (Radio Frequency) module for converting the recharging amount transmitted by the USB key 101 from an electromagnetic wave signal to digital information by modulation/demodulation means, and transmitting the information to the first antenna module, and converting the deposit balance received by the first RF module to an electromagnetic wave signal and transmitting the signal to the USB key 101; and a digital cash storage module for storing the recharging amount received by the first antenna module.

Accordingly, the USB key 101 also comprises a second antenna module for transmitting a recharging amount to the contactless smart card and inducing and receiving the deposit balance transmitted from the contactless smart card device; and a second RF (Radio Frequency) module for converting the deposit balance transmitted from the contactless smart card device from an electromagnetic wave signal to digital information by modulation/demodulation means and transmitting the information to the second antenna module, and converting the recharging amount received by the second antenna module to an electromagnetic wave signal and transmitting the signal to the contactless smart card device.

The smart card device 103 as shown in FIG. 2 can also be built into the USB key 101. The recharging operation in this embodiment can be replaced with a loading operation or other transaction operations.

Figure 3:
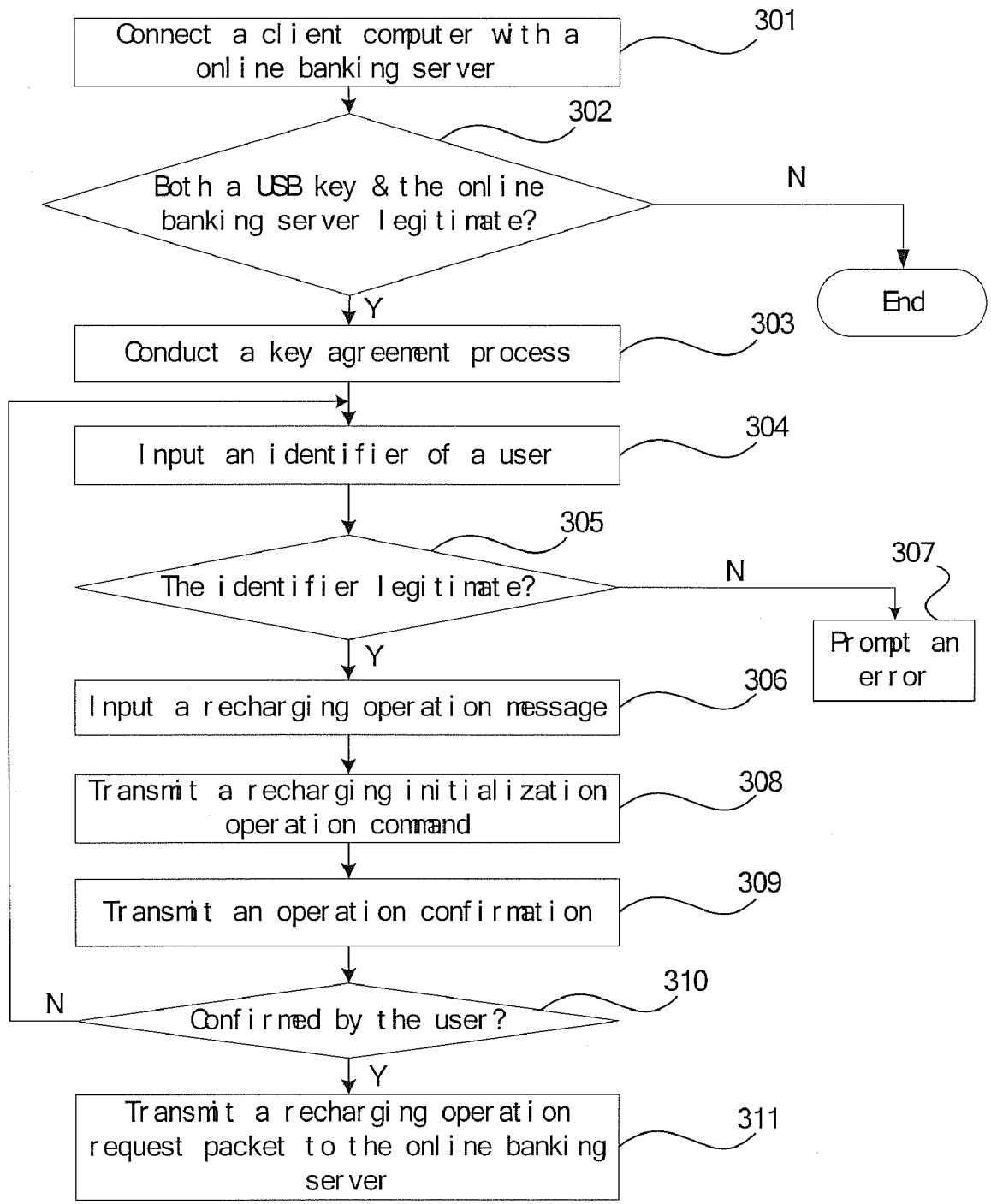
FIG. 3 is a flow diagram of a method for authenticating between a client and a server according to the second embodiment of the present invention.
Figure 4:
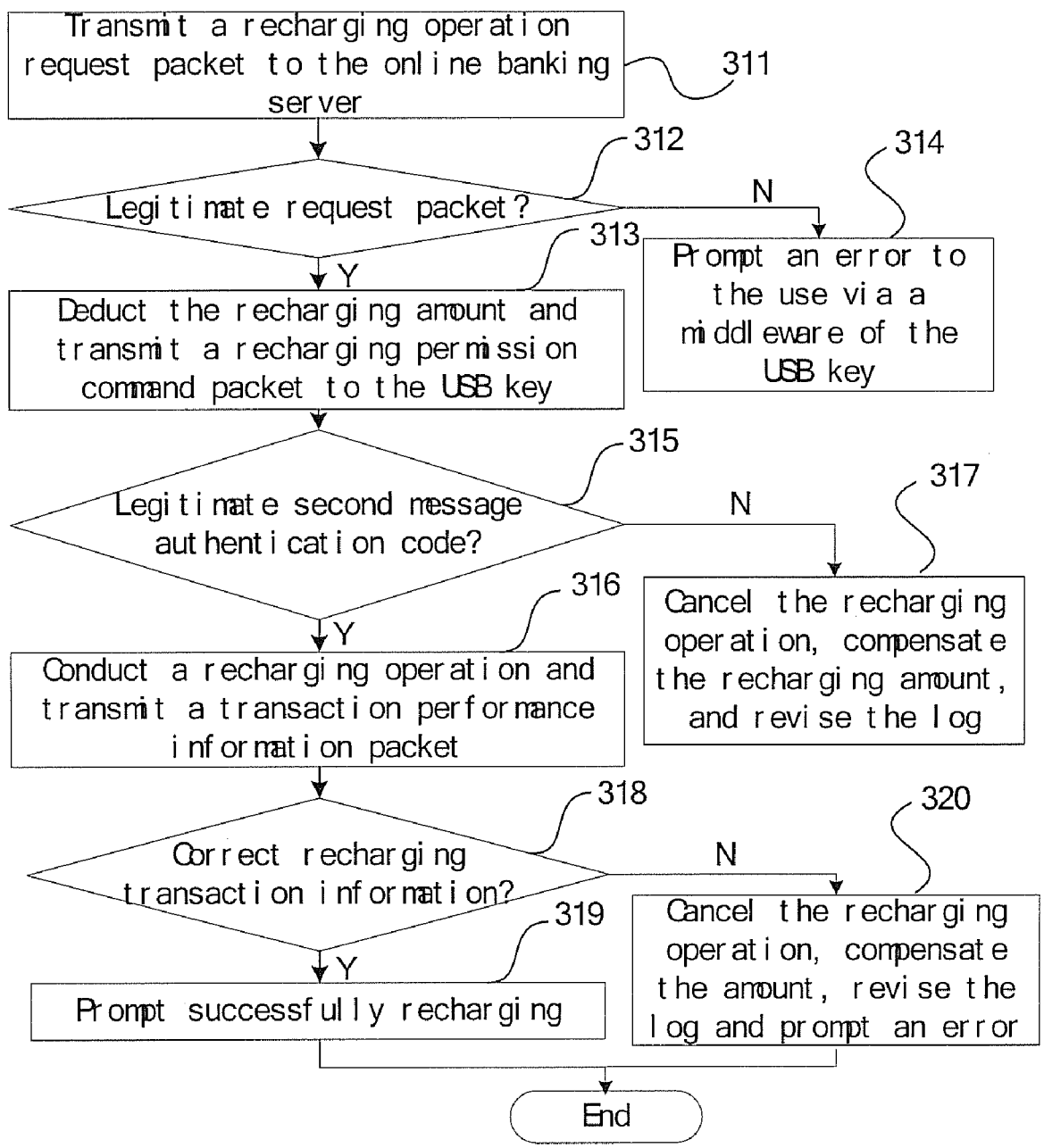
FIG. 4 is a flow diagram of a method for loading with a USB key and an online banking server according to the second embodiment of the present invention.

A second embodiment provides a method for self-service recharging with a USB key as the secure transaction device. Referring to FIG. 3, it demonstrates the process of authenticating each other between the client and the server before conducting the recharging operation. Referring to FIG. 4, it demonstrates a process of recharging with a USB key and an online banking server. In particular, the method comprises the steps of:

Step 301: connecting a client computer with an online banking server;

Step 302: authenticating mutually between a USB key and the online banking server for legitimacy, in which if both are legitimate, go to the step 303; otherwise, the client cannot establish a data security channel with the server, and operation terminates;

Step 303: conducting a key agreement process between the USB key and the online banking server to establish a data security channel;

Step 304: prompting, by the USB key, a user to input an identifier through the computer, and inputting, by the user, the identifier to the USB key through the computer, after establishing the data security channel; (in this embodiment, the identifier may be a user-defined password or a user biometric, such as a fingerprint or iris image, etc.)

Step 305: authenticating, by the USB key, whether the identifier is legitimate; if legitimate, going to the step 306; otherwise, going to the step 307;

Step 306: allowing the user to make access to an operating system of the USB key, and input a recharging operation message, including a recharging amount, to the USB key;

Step 307: prompting the user an identifier error;

Step 308: receiving by the USB key the recharging operation message from the user, packing the message, and transmitting a recharging initialization operation command to a controller of the USB key;

Step 309: transmitting an operation confirmation to the user through an output means after receiving the recharging initialization operation command by the controller of the USB key;

Step 310: determining whether the user has confirmed the operation; if confirming the confirmation by the user that it is correct, going to the step 311; otherwise, going to the step 304; (in this embodiment, the USB key will wait for confirmation of the user for a time period that can be defined as required; if the user has not confirmed after the time period, it is deemed that the operation confirmation is incorrect, and it is directed to the step 304 for a new user operation); and Step 311: transmitting a recharging operation request packet to the online banking server through the computer by the USB key, which comprises a user identifier, an electronic wallet balance amount, a card number of the transaction account, a recharging amount, a serial number of the online transaction, a key version number, an algorithm identifier, a pseudo random number (for the IC card or USB key), and a first message authentication code;

the first message authentication code is a function of the recharging initialization operation command, and is generated by computing data in the recharging initialization operation command using an internal algorithm of the USB key.

Referring to FIG. 4, the recharging process with the USB key and the online banking server comprises the steps of:

Step 311: transmitting a recharging operation request packet to the online banking server through the computer by the USB key;

Step 312: verifying, by the online banking server, whether the recharging operation request packet is legitimate after receiving the recharging operation request packet from the client; if legitimate, going to the step 313; otherwise, going to the step 314;

verifying whether the user account information stored natively complies with the recharging operation (e.g. whether allowed by the overdraft right); if it complies with the recharging amount from the recharging operation request packet, generating a first information verification code using an algorithm stored natively by the online banking server, reading the first message authentication code from the recharging operation request packet, and comparing the first information verification with the first message authentication code; in which if they are identical, the recharging operation request packet is legitimate; otherwise, it is not legitimate;

Step 313: deducting a recharging amount from the user account according to the recharging transaction amount information, and transmitting a recharging permission command packet to the USB key through the client computer, and recording the operation log by the online banking server;

in this embodiment, the recharging permission command packet comprises a second message authentication code, a transaction date (host), a transaction time (host), and a recharging amount; the second message authentication code is a function of the information in the recharging operation request packet from the client, the transaction date (host), and the transaction time (host), and is generated by computing the information in the recharging operation request packet from the client, the transaction date (host), and the transaction time (host) using an internal algorithm by the online banking server;

Step 314: prompting an error to the user through the client computer by the online banking server, if the recharging operation request packet is not legitimate based on verification of the online banking server;

Step 315: verifying whether the second message authentication code from the recharging permission command packet is legitimate by the USB key after receiving the recharging permission command packet from the online banking server; if legitimate, going to the step 316; otherwise, going to the step 317;

where the second message authentication code is verified by generating a second information verification code by the USB key according to the information stored natively, and comparing it with the second message authentication code; in which if they are identical, the second message authentication code is legitimate; otherwise, the second message authentication code is not legitimate;

Step 316: conducting a recharging operation, recording the operation log, and transmitting a transaction performance information packet to the online banking server by the USB key;

Step 317: transmitting an error message to the online banking server through the client computer by the USB key, canceling the recharging operation by the online banking server, compensating the amount deducted from the user account by the online banking server, and revising the operation log by the online banking server;

Step 318: verifying by the online banking server whether the recharging transaction information in the transaction performance information packet transmitted from the USB key is correct; if correct, going to the step 319; otherwise, going to the step 320;

Step 319: prompting recharging successfully to the user by the online banking server; and Step 320: canceling the recharging operation, compensating the amount deducted from the user account, revising the operation log, and prompting an error message (the recharging operation failed) to the user through the client computer, by the online banking server.

In case that the user is intended to transfer an amount of money in a banking card stored from the USB key to a smart card device, the following operations should be performed, in which the smart card device is a contactless IC card.

1) The user moves a contactless IC card into a valid range of the USB key, so that the contactless IC card and the USB key authenticate each other for legitimacy. If both legitimate, the USB key reads the balance amount from the contactless IC card, outputs the amount through its display means or a computer, and prompts the user to input his identifier for the contactless IC card; if at least one of them is not legitimate based on authentication of the other side, the USB key prompts an error to the user through its display means or a computer. In this embodiment, the legitimacy authentication between the contactless IC card and the USB key is processed by comparing identification codes as follows.

The USB key reads an identification code from the contactless IC card and compares it with each of the identification codes of legitimate IC cards stored in the USB key, to authenticate the contactless IC card by determining if the two codes are identical; only if identical, the contactless IC card is legitimate;

the contactless IC card receives an identification code from the USB key and compares it with each of the identification codes of legitimate USB keys stored in the contactless IC card, to authenticate the USB key by determining whether the two codes are identical; only if identical, the USB key is legitimate;

If the two codes are not identical in at least one of the comparison operations, the authentication fails.

In this embodiment, the identification code of the USB key is a hardware serial number; and the identification code of the contactless IC card is a card number.

2) The user inputs his identifier for the contactless IC card, and then the contactless IC card verifies whether the input of the user is correct; if correct, the USB key transmits a recharging amount to the contactless IC card. The user completes the self-service recharging process and is able to pay for something using the contactless IC card. If incorrect, the USB key prompts an error to the USB by a sonic means.

In this embodiment, the identifier of the user is a user-defined password.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

The invention claimed is:

1. A system for self-service recharging, wherein the system comprises a client and a server; the client comprises a first authentication module, a key agreement module, and a secure transaction device with the function of an electronic wallet; and the server comprises a second storage module, a second authentication module, and a second service performance module; in which the first authentication module is adapted to verify whether the server is legitimate;

the key agreement module is adapted to conduct, together with the secure transaction device, a key agreement process with the server to establish a data security channel according to a result of the key agreement process, if the server is legitimate after being verified by the first authentication module;

the secure transaction device comprises a first storage module for storing data and a key agreement algorithm relating to the key agreement process with the server, as well as a certificate of the secure transaction device;

a user authentication module for verifying whether an identifier of a user is legitimate after receiving the identifier from an input of the user; and a first service performance module for allowing the user, after being verified by the user authentication module, to input a recharging operation message, transmitting a recharging operation request packet to the server and receiving a recharging permission command packet returned from the server, conducting a recharging operation after verifying the recharging permission command packet returned from the server, and recording an operation log and a transaction process Implemented on the secure transaction device as a transaction terminal; the recharging operation request packet comprising a user account and a recharging amount; and the server comprises a second storage module for storing user account information, user identity information, data and a key agreement algorithm relating to the key agreement process with the secure transaction device, and a certificate of the server;

a second authentication module for verifying whether the secure transaction device is legitimate, conducting the key agreement process with the secure transaction device using the data and algorithm stored in the second storage module to establish the data security channel if the secure transaction device is legitimate, and verifying whether the recharging operation request packet is legitimate according to the user account information and user identity information stored in the second storage module, after receiving the recharging operation request packet transmitted from the secure transaction device; and a second service performance module for deducting the recharging amount from the user account and returning the recharging permission command packet to the secure transaction device if the recharging operation request packet is legitimate after being verified by the second authentication module; and the recharging permission command packet comprising a transaction time and the recharging amount.

2. The system of claim 1, wherein the recharging operation request packet transmitted from the first service performance module of the secure transaction device further comprises a first message authentication code;

accordingly, the second storage module of the server further comprises an algorithm for verifying the certificate of the secure transaction device and an algorithm for generating a first information verification code; and the second authentication module comprises
  a security authentication unit for verifying whether the certificate of the secure transaction device is legitimate using the algorithm from the second storage module; if legitimate, conducting the key agreement process with the secure transaction device to establish the data security channel with the secure transaction device by the server; otherwise, the data security channel with the secure transaction device being not able to be established, and terminating the recharging operation; and
  a recharging operation request packet authentication unit for verifying whether the user account from the second storage module complies with the recharging operation after receiving the recharging operation request packet from the secure transaction device; if the user account complies with the recharging amount in the recharging operation request packet, generating a first information verification code using the algorithm from the second storage module and verifying the first message authentication code from the recharging operation request packet against the first information verification code, and if identical, the recharging operation request packet being legitimate.

3. The system of claim 1, wherein the recharging permission command packet returned from the service performance module of the server to the secure transaction device further comprises a second message authentication code;

accordingly, the first storage module of the secure transaction device is further used to store an algorithm for generating a second information verification code;

the secure transaction device comprises
  an authentication module for generating the second information verification code using the algorithm from the first storage module, verifying the second message authentication code from the recharging permission command packet against the second information verification code after receiving the recharging permission command packet returned from the server, and if identical, the second information authentication being legitimate and informing the first service performance module of performing an recharging operation; otherwise, transmitting an error message to the server; and the server further comprises
  a recharging withdrawal module for canceling the recharging operation, compensating the recharging amount deducted by the second service performance module from the user account and revising the operation log, after receiving the error message transmitted from the secure transaction device.

4. The system of claim 1, wherein the first service performance module comprises
  an initialization operation command generation unit for allowing the user to input a recharging operation message after the identifier of the user is verified by the user authentication module, packing the recharging operation message, and generating a recharging initialization operation command;
  an operation confirmation transmission unit for transmitting an operation confirmation to the user according to the recharging initialization operation command after the recharging initialization operation command is generated by the initialization operation command generation unit;
  a determination unit for determining whether the operation confirmation from the user is correct;
  a recharging request transmission unit for transmitting a recharging operation request packet to the server through a computer if the operation confirmation from the determination unit is correct; and the recharging operation request packet comprising the user account and the recharging amount; and
  a recharging operation performance unit for conducting the recharging operation and recording the operation log after receiving the recharging permission command packet returned from the server.

5. The system of claim 1, wherein the secure transaction device further comprises
  a transaction notification module for transmitting a transaction performance information packet to the server after conducting the recharging operation and recording the operation log;

accordingly, the server further comprises
  a recharging confirmation module for determining whether information in the transaction performance information packet is correct after receiving the transaction performance information packet transmitted from the secure transaction device; if correct, notifying the user of successfully recharging; otherwise, canceling the recharging operation, compensating the recharging amount deducted from the user account, revising the operation log, and transmitting an error message informing that the recharging fails to the user.

6. The system of claim 1, wherein the system further comprises
  a smart card device for transmitting a deposit balance message to the secure transaction device and verifying whether the user is legitimate, and if legitimate, obtaining the recharging amount from the secure transaction device.

7. The system of claim 6, wherein the secure transaction device further comprises
  a prompt module for prompting the user an error if the user is not legitimate based on a verification of the smart card device; and
  a recharging amount transmission module for transmitting the recharging amount to the smart card device if the user is legitimate based on a verification of the smart card device.

8. The system of claim 7, wherein the prompt module is a sonic module with a voice prompt function or a display module with a display function.

9. The system of claim 6, wherein the smart card device is a contact or contactless smart card device.

10. The system of claim 9, wherein the contactless smart card device comprises
- a first antenna module for transmitting the deposit balance message to the secure transaction device, as well as inducing and receiving the recharging amount transmitted from the secure transaction device;
- a first RF (Radio Frequency) module for converting the recharging amount from the secure transaction device from an electromagnetic wave signal to digital information by modulation/demodulation means, then transmitting the information to the first antenna module, and converting the deposit balance message received by the first antenna module to an electromagnetic wave signal, then transmitting the signal to the secure transaction device; and
- an electronic cash storage module for storing the recharging amount received by the first antenna module;

accordingly, the secure transaction device further comprises
- a second antenna module for transmitting the recharging amount to the contactless smart card device, as well as inducing and receiving the deposit balance message transmitted to the contactless smart card device; and
- a second RF (Radio Frequency) module for converting the deposit balance message transmitted from the contactless smart card device from an electromagnetic wave signal to digital information by modulation/demodulation means, then transmitting the information to the second antenna module, and converting the recharging amount received by the second antenna module to an electromagnetic wave signal, then transmitting the signal to the contactless smart card device.

11. A method for self-service recharging, wherein the method comprises the steps of
- A. connecting a client with a server;
- B. authenticating each other between the server and a secure transaction device with the function of an electronic wallet for legitimacy; if both legitimate, conducting a key agreement process between the client and the server to establish a data security channel, and then going to the step C; otherwise, the data security channel being not established between the client and the server, and the operation terminating;
- C. packing the recharging operation message, generating a recharging initialization operation command, and transmitting an operation confirmation to the user by the secure transaction device after the secure transaction device receives a recharging operation message input by a user;
- D. transmitting a recharging operation request packet, by the secure transaction device, to the server after the operation confirmation being confirmed by the user; the recharging operation request packet comprising a user account of the user and a recharging amount;
- E. verifying whether the recharging operation request packet is legitimate by the server after the server receives the recharging operation request packet; if legitimate, deducting the recharging amount from the user account, recording an operation log, transmitting a recharging permission command packet to the secure transaction device, and then going to the step F; otherwise, prompting the user an error through the secure transaction device;
- F. conducting a recharging operation, recording an operation log, and then transmitting a transaction performance information packet to the server by the secure transaction device after the secure transaction device receives the recharging permission command packet; and
- G. determining whether recharging transaction information in the transaction performance information packet is correct by the server; if correct, prompting a successfully recharging message to the user; otherwise, canceling the recharging operation, compensating the recharging amount deducted from the user account, revising the operation log, and prompting a recharging fail message to the user.

12. The method of claim 11, wherein the authenticating each other between the server and a secure transaction device for legitimacy at the step B comprises
- authenticating whether a certificate of the secure transaction device is legitimate by the server; and
- authenticating whether a certificate of the server is legitimate by the secure transaction device.

13. The method of claim 11, wherein the step C further comprises
- inputting an identifier by the user to the secure transaction device, and determining by the secure transaction device whether the identifier is legitimate; if legitimate, allowing the user to input a recharging operation message; otherwise, prompting an identifier error to the user.

14. The method of claim 11, wherein the recharging operation request packet at the step D comprises a first message authentication code generated by the secure transaction device;

accordingly, the verifying whether the recharging operation request packet is legitimate at the step E comprises
- verifying whether the user account complies with the recharging amount from the recharging operation request packet by the server; if yes, going to the next operation; otherwise, terminating; and
- verifying whether the first message authentication code from the recharging operation request packet is legitimate by the server after verifying whether the user account complies with the recharging amount from the recharging operation request packet by the server; if yes, the recharging operation request packet being legitimate; otherwise, the recharging operation request packet being not legitimate.

15. The method of claim 11, wherein the recharging permission command packet at the step E comprises a second message authentication code;

accordingly, the step F further comprises
- verifying by the secure transaction device the second message authentication code from the recharging permission command packet; if legitimate, conducting the recharging operation; otherwise, transmitting an operation error message to the server; and
- canceling the recharging operation, compensating the recharging amount deducted from the user account, and then revising the operation log by the server after the server receives the error message.

16. The method of claim 11, wherein the method further comprises the steps of:
- H. moving the smart card device by the user into a valid range of the secure transaction device for reading the card;
- I. reading a deposit balance amount from the smart card device by the secure transaction device, outputting the deposit balance amount through a prompting means of the secure transaction device, and prompting the user to input a user identifier for the smart card device; and J. determining whether the user identifier is correct after inputting the user identifier by the user; if correct, transmitting a recharging amount to the smart card device; otherwise, prompting an error message to the user.

17. The method of claim 16, wherein the step H further comprises authenticating each other between the smart card device and the secure transaction device; if both positive, going to the step I; otherwise, prompting an error message to the user.

* * * * *